United States Patent [19]
Carter et al.

[11] Patent Number: 5,710,232
[45] Date of Patent: Jan. 20, 1998

[54] POLY(ESTER-AMIDE) POLYOLS

[75] Inventors: Steve Carter, Brussels; Christopher Phanopoulos, Tervuren, both of Belgium

[73] Assignee: Imperial Chemical Industries PLC, London, England

[21] Appl. No.: 601,664

[22] Filed: Feb. 15, 1996

Related U.S. Application Data

[63] Continuation of Ser. No. 125,875, Sep. 23, 1993, abandoned.

[30] Foreign Application Priority Data

Oct. 19, 1992 [GB] United Kingdom ............... 9221869

[51] Int. Cl.$^6$ ............ C08G 18/60; C07C 233/17; C07C 233/46; C07C 69/00
[52] U.S. Cl. ............ 528/82; 521/163; 521/164; 528/75; 560/88; 560/116; 560/110; 560/125; 560/127; 560/128; 560/193; 560/196
[58] Field of Search .................... 521/163, 164; 528/75, 82; 560/39, 41, 116, 125, 127, 128, 170, 171, 172, 88, 110, 193, 196

[56] References Cited

U.S. PATENT DOCUMENTS

| | | | |
|---|---|---|---|
| 4,123,422 | 10/1978 | Erikson et al. | 528/273 |
| 4,235,730 | 11/1980 | Schlicht | 528/82 |
| 4,681,903 | 7/1987 | Haas et al. | 521/164 |
| 4,801,736 | 1/1989 | Bagaglio et al. | 560/88 |
| 5,091,494 | 2/1992 | Leistner et al. | 528/45 |

FOREIGN PATENT DOCUMENTS

| | | |
|---|---|---|
| 0235887 | 9/1987 | European Pat. Off. . |
| 594292 | 4/1994 | European Pat. Off. . |
| 03070734 | 3/1991 | Japan . |
| 561108 | 5/1944 | United Kingdom . |

OTHER PUBLICATIONS

*Lactone–Based Diol Chain Extenders for Polyurethanes*, The Society of the Plastics Industry, Inc., Polyurethane Division, Nov. 5–7, 1984, pp. 138–141.
*Chemical Abstracts*, 114: 229675u, Jun., 1991.
*Chemical Abstracts*, 110: 136939k, Apr., 1991.

*Primary Examiner*—Rabon Sergent

[57] ABSTRACT

Compounds having the formula

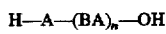

wherein
n is 1–20;
A is

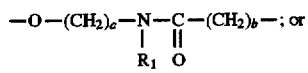

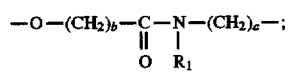

B is

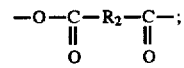

$R_1$ is alkyl having 1–6 carbon atoms;
$R_2$ is an alkylene having 1–6 carbon atoms, alkenylene having 2–6 carbon atoms, cyclo-alkylene or cycloalkenylene having 5–8 carbon atoms or phenylene having 6–10 carbon atoms;
a is 1–6; and
b is 2–6.

These compounds are useful for making polyurethanes.

9 Claims, No Drawings

POLY(ESTER-AMIDE) POLYOLS

CROSS-REFERENCE TO RELATED APPLICATIONS

The present application is a continuation of U.S. patent application Ser. No. 08/125,875 filed Sep. 23, 1993, entitled "Novel Polyols" now abandoned.

The present invention is concerned with novel polyols, a reaction system comprising such polyols and a process for preparing elastomers by reacting such polyols with polyisocyanates.

Polyamide polyester polyols have been described in Japanese Patent Application J03028225.

Surprisingly a novel class of polyols has been found which provides elastomers with a high hardness and exceptionally high damping properties.

The invention is concerned with compounds having the formula

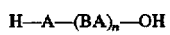

wherein n is 1–20 preferably 1–15;

A is

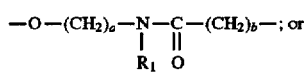

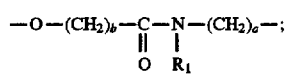

B is

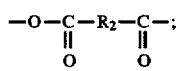

$R_1$ is alkyl having 1–6 carbon atoms and preferably 1 or 2 carbon atoms;

$R_2$ is an alkylene having 1–6 carbon atoms, alkenylene having 2–6 carbon atoms, cycloalkylene or cycloalkenylene having 5–8 carbon atoms or phenylene having 6–10 carbon atoms a is 1–6 preferably 2 or 3; and b is 2–6 preferably 4 or 5.

$R_1$ may be selected from any alkyl having 1–6 carbon atoms like methyl, ethyl, propyl, isopropyl, butyl, pentyl and hexyl. Preferably $R_1$ is methyl or ethyl and most preferably methyl. $R_2$ may be selected from an alkylene group having 1–6 carbon atoms like methylene, ethylene, ethylethylene, tri-, tetra-, penta- and hexamethylene; from an alkenylene group having 1–6 carbon atoms like ethenylene and propenylene; from a cycloalkylene group having 5–8 carbon atoms like cyclopentylene and cyclohexylene; from a cycloalkenylene group having 5–8 carbon atoms like 3-cyclopenten-1,2-ylene and 3-cyclohexen-1,2-ylene and from a phenylene group having 6–10 carbon atoms like o-,m- and p-phenylene, 3-methyl-1,2-phenylene and 2-methyl-1,4-phenylene. The preferred groups are ethylene, trimethylene and tetramethylene and o-, m- and p-phenylene. The most preferred groups are ethylene, trimethylene and tetramethylene. Different groups selected from the groups encompassed by the definition of $R_2$ may be present.

The compounds according to the present invention are prepared by reacting a compound of formula 1: HO—$(CH_2)_a$—$NHR_1$ and a compound of formula 2:

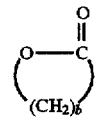

(wherein $R_1$, a and b have the meaning given above) in a stoichiometric ratio at a temperature of 60–120 and preferably 80°–100° C. for 30–240 preferably 60–180 minutes at atmospheric pressure if desired in the presence of a catalyst like stannous octoate, tetrabutyl-o-titanate and dibutyltin dilaurate, giving a product of formula 3:

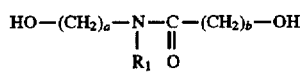

which is then reacted with a compound of formula 4:

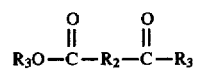

wherein $R_3$ is hydrogen or an alkyl group having 1–6 carbon atoms and preferably is hydrogen or methyl, or formula 5:

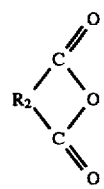

(wherein $R_2$ has the same meaning as given above) in a molar ratio of 1.05–3:1 and preferably 1.05–2.5:1 at a temperature of 120°–200° preferably 140°–180° C. for 5–10 preferably 6–8 hours at atmospheric pressure. Some unreacted formula 3 compound may remain and not all compounds according to the present invention so obtained will have the same value for n. Therefore the values for n are average values.

Examples of formula 1 compounds are N-methylethanolamine, N-ethyl ethanolamine, N-methyl propanolamine and N-ethyl propanolamine and mixtures thereof.

Examples of formula 2 compounds are β-propiolactone, γ-butyrolactone, δ-valerolactone and ε-caprolactone and mixtures thereof.

Examples of formula 4 compounds are malonic acid, succinic acid, glutaric acid, adipic acid, pimelic acid, maleic acid, fumaric acid, phthalic acid, terephthalic acid, isophthalic acid, cyclohexane dicarboxylic acid and mixtures thereof and their dimethyl esters. Most preferred compounds are succinic, glutaric and adipic acid and mixtures thereof.

Examples of formula 5 compounds are the anhydrides of the dicarboxylic acids mentioned above and mixtures thereof.

The polyols so obtained may be used for preparing polyurethanes by reacting them with polyisocyanates. In particular the polyols may be used to prepare elastomers including microcellular elastomers and blown and non-blown thermoplastic polyurethanes. The polyisocyanates which may be used are selected amongst those generally used in preparing polyurethanes like aliphatic, cycloaliphatic, araliphatic and aromatic polyisocyanates. Examples are hexamethylene diisocyanate, isophorone diisocyanate, cyclohexane-1,4- diisocyanate, 4,4'-dicyclohexylmethane diisocyanate, m- and p- tetramethylxylene diisocyanates, tolylene diisocyanates, phenylene diisocyanates and especially polymethylene polyphenylene polyisocyanates like 4,4'- and 2,4'-diphenylmethane diisocyanate (MDI) and mixtures thereof and polymethylene polyphenylene polyisocyanates having an isocyanate functionality of more than two like those known in the art as polymeric MDI and crude MDI. Further modified forms of MDI may be used that is to say MDI modified by the introduction of urethane, allophanate, urea, biuret, carbodiimide, uretonimine or isocyanurate residues. These so-called MDI variants particularly include uretonimine-modified MDI having NCO contents of 25% by weight and more.

In conjunction with the polyols according to the present invention other isocyanate-reactive ingredients may be used like chain extenders and cross-linkers in general having a molecular weight of at most 600 like ethylene glycol, butanediol, glycerol, trimethylolpropane, diethylene glycol, propylene glycol, dipropylene glycol, diethyltoluene diamine, ethylene diamine, ethanolamine and triethanolamine and like isocyanate-reactive compounds having a higher molecular weight e.g. 1000–10.000 like polyamines and polyols having 2–6 in particular 2–3 isocyanate-reactive groups. Polyols which may be used in particular may be selected from polyester and from polyether polyols.

Conditions for obtaining microcellular elastomers or blown thermoplastic polyurethanes are obtained by allowing the reaction between the polyisocyanate composition and the isocyanate-reactive compounds to take place in the presence of a physical blowing agent like the commonly known compounds having a low boiling point like e.g. chloro-fluoro-carbons (CFC's) and hydro-chloro-fluoro-carbons (HCFC's) or in the presence of water.

Preferably water is used optionally together with such physical blowing agents. For environmental reasons it is most preferred to use water as the only blowing agent. The amount of water will depend on the index (100 times the ratio of the number of isocyanate groups over the number of isocyanate-reactive groups in the foam-forming reaction mixture) used in preparing the foamed material and the desired density. In general the amount of water may range from 0.05–5% by weight calculated on the amount of isocyanate-reactive compounds having at least two isocyanate-reactive groups and a molecular weight of 1000–10000.

The amount of the ester-amide polyols according to the present invention used in preparing the polyurethane ranges from 20 to 90 and preferably from 30 to 75% by weight calculated on the total weight of the isocyanates and isocyanate reactive compounds used in preparing the polyurethane. The polyurethane forming reaction may be conducted according to the prepolymer, semi-prepolymer and the one-shot method. In case the prepolymer or the semi-prepolymer method is employed the amount of polyol in this prepolymer or semi-prepolymer is taken into account in calculating the above range for the amount of ester-amide polyol and water used.

The polyurethane forming reaction is carried out at an index of 80–120, preferably of 90–110 and most preferably of 95–105.

The present invention further is concerned with a reaction system comprising in separate containers a polyisocyanate and a compound according to the present invention. If other isocyanate-reactive ingredients are used, like chain extenders, cross-linkers and isocyanate-reactive compounds of higher molecular weight such ingredients may be mixed with the compounds according to the present invention before they are brought into contact with the polyisocyanate; the same applies to the blowing agents like water.

The polyurethane-forming reaction mixture may contain one or more of the additives conventional to such reaction mixtures. Such additives include catalysts, for example tertiary amines and tin compounds, surface-active agents and stabilizers, for example siloxane-oxyalkylene copolymers, flame retardants, organic and inorganic fillers, pigments and internal mould release agents. These additives as well may be premixed with the compounds according to the present invention.

The polyisocyanate compositions according to the present invention are very useful for making elastomers, microcellular elastomers and blown or non-blown thermoplastic polyurethanes. Good quality materials are obtainable having a density of 300–1200 kg/m$^3$ and showing extremely good damping properties.

The invention is illustrated by way of the following examples.

EXAMPLE 1

467.2 parts by weight (pbw) of ε-caprolactone and 307.4 pbw of N-methyl ethanolamine were charged into a reactor fitted with an agitator and a distillation device. The reaction was conducted while stirring under $N_2$ (10 l/hr). The temperature was allowed to rise to 90° C. and kept at 90° C. for 1 hour. Then 299.2 pbw of adipic acid was added with 0.043 pbw of tetrabutyl-o-titanate (catalyst) and the mixture was heated to 150° C. Then the pressure was reduced to 50 mbar maintaining the $N_2$ sparge rate at 10 l/hr. Then water began to distill and was collected via a dry ice condenser. After 4 hours the pressure was reduced further to 10 mbar. After 7 hours at 150° C. 73.8 pbw of water had been collected. The product obtained was a product according to the present invention (confirmed by GPC- and $C^{13}$-NMR analysis) having an OH value of 185 mg KOH/g, an acid value of 0.4 mg KOH/g, a viscosity of 970 mPa.s at 50° C. and a water content of 0.02% by weight.

EXAMPLE 2

A polyol composition 1 was made by mixing 87.3 pbw of the above product, 11.5 pbw of 1,4-butanediol, 0.6 pbw of Dabco S (a catalyst from Air Products), 0.3 pbw of DC 193 (a surfactant from DOW Corning) and 0.3 pbw of water.

Further polyol compositions 2 and 3 were made as above with the exception that the compositions contained instead of the 87.3 pbw of the above product 43.65 pbw of the above product and 43.65 pbw of a standard polyol (Daltorez 1620, a polyester polyol having a functionality of 2 and a molecular weight of about 2000 obtainable from ICI, Daltorez is a trademark of ICI PLC), (composition 2) and 87.3 pbw of this standard polyol (composition 3).

EXAMPLE 3

The polyol compositions 1 and 3 were reacted with a polyisocyanate (PBA 2224, an isocyanate prepolymer having an NCO value of 18.1% by weight obtainable from ICI) at an index of 100.

Microcellular elastomers were obtained having the following properties:

|  | Product according to the invention | Standard Polyol |
|---|---|---|
| Density[1] (kg/m³) | 551 | 561 |
| Hardness[2] (Sh°A) | 96 | 54 |
| Ball rebound[3] (%) | 0 | 29.3 |
| Tear strength[4] (kN/m) | 28.4 | 13.5 |
| Tensile strength at break[5] (MPa) | 9.4 | 5.9 |
| Elongation[6] at break (%) | 262 | 470 |

[1] measured according to DIN 53420
[2] measured according to DIN 53505
[3] measured according to ISO 8307
[4] measured according to DIN 53507
[5] measured according to DIN 53504
[6] measured according to DIN 53504

EXAMPLE 4

Example 1 was repeated using instead of 299.2 pbw of adipic acid other acids (see Table 1). The products obtained were products according to the present invention (confirmed by GPC- and $C^{13}$-NMR analysis) having an OH value, an acid value and a viscosity as indicated in Table 1.

TABLE 1

| Example | Acid | OH value, mg KOH/g | Acid value, mg KOH/g | Viscosity, mPa·s at 75° C. |
|---|---|---|---|---|
| 4a | 148.5 pbw of adipic acid + 150.6 pbw of phthalic anhydride | 220 | 0.54 | 580 |
| 4b | 241.8 pbw of Succinic acid | 263 | 0.34 | 185 |
| 4c | 438 pbw of adipic acid | 58 | 0.43 | 2000 |

We claim:

1. Compounds having the formula

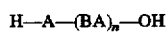

H—A—(BA)$_n$—OH wherein n is 1–20;

A is

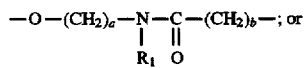

$$-O-(CH_2)_a-N(R_1)-C(=O)-(CH_2)_b-; \text{ or}$$

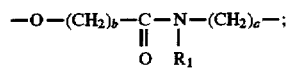

$$-O-(CH_2)_b-C(=O)-N(R_1)-(CH_2)_a-;$$

B is

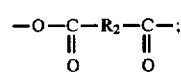

$$-O-C(=O)-R_2-C(=O)-;$$

$R_1$ is alkyl having 1–6 carbon atoms;

$R_2$ is an alkylene having 1–6 carbon atoms, alkenylene having 2–6 carbon atoms, cyclo-alkylene or cycloalkenylene having 5–8 carbon atoms or phenylene having 6–10 carbon atoms;

a is 1–6; and b is 2–6.

2. Compounds according to claim 1 wherein $R_1$ is methyl or ethyl.

3. Compounds according to claim 1 wherein $R_2$ is ethylene, trimethylene or tetramethylene.

4. Compounds according to claim 1 wherein a is 2 or 3.

5. Compounds according to claim 1 wherein b is 4 or 5.

6. Compounds according to claim 1 wherein n is 1–15.

7. Compounds according to claim 1, wherein $R_1$ is selected from the group consisting of methyl and ethyl; $R_2$ is selected from the group consisting of ethylene, trimethylene and tetramethylene; a is 2 or 3; b is 4 or 5; and n is 1–15.

8. Process for preparing a polyurethane by reacting a compound according to claim 1 with a polyisocyanate, wherein said compound is present in an amount of from 20 to 90% by weight of said polyisocyanate and said compound according to claim 1 and said reaction is carried out at an index of 80 to 120.

9. Reaction systems comprising in separate containers (a) a polyisocyanate; and (b) a compound according to claim 1, wherein said compound is present in an amount of from 20 to 90% by weight of said polyisocyanate and said compound according to claim 1 and said reaction is carried out at an index of 80 to 120.

* * * * *